(12) United States Patent
Frederick et al.

(10) Patent No.: US 10,399,606 B2
(45) Date of Patent: Sep. 3, 2019

(54) MULTI-PIECE OVERFENDER ASSEMBLIES AND METHODS OF MOUNTING THE SAME TO VEHICLES

(71) Applicant: Toyota Motor Engineering & Manufacturing North America, Inc., Erlanger, KY (US)

(72) Inventors: Scott L. Frederick, Brighton, MI (US); Scott P. Robison, Dexter, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 25 days.

(21) Appl. No.: 15/883,994

(22) Filed: Jan. 30, 2018

(65) Prior Publication Data

US 2019/0233020 A1    Aug. 1, 2019

(51) Int. Cl.
| | | |
|---|---|---|
| *B60N 99/00* | (2006.01) | |
| *B62D 25/16* | (2006.01) | |
| *B62D 29/00* | (2006.01) | |

(52) U.S. Cl.
CPC ......... *B62D 25/163* (2013.01); *B62D 25/161* (2013.01); *B62D 29/005* (2013.01)

(58) Field of Classification Search
CPC ... B62D 25/163; B62D 25/161; B62D 29/005
See application file for complete search history.

(56) References Cited

U.S. PATENT DOCUMENTS

| 5,769,484 A * | 6/1998 | Shiino ........................ B60J 5/04 |
| | | 296/151 |
| 2017/0282975 A1* | 10/2017 | Nakauchi ............... B62D 25/12 |

FOREIGN PATENT DOCUMENTS

| CA | 2995163 A1 * | 9/2017 | ............. B60K 11/04 |
| JP | 02041986 A * | 2/1990 | |
| JP | 02102880 A * | 4/1990 | ............. B62D 25/18 |
| JP | 08230715 A * | 9/1996 | |
| JP | 2002347660 A | 12/2002 | |
| JP | 2004306922 A * | 11/2004 | |
| JP | 474558 B2 | 11/2008 | |
| JP | 6052210 B2 | 12/2016 | |
| JP | 6094515 B2 | 3/2017 | |

* cited by examiner

*Primary Examiner* — Lori L Lyjak
(74) *Attorney, Agent, or Firm* — Dinsmore & Shohl LLP

(57) ABSTRACT

A vehicle includes a wheel within a wheel well, a fender panel assembly that includes a fender outer panel and a fender inner panel, the fender panel assembly at least partially surrounding the wheel well, and an overfender assembly connected to the fender panel assembly. The overfender assembly includes an overfender backing including a fender outer panel connection portion that connects to the fender outer panel and a fender inner panel connection portion that connects to the fender inner panel and an overfender garnish connected to the overfender backing. The overfender garnish and the overfender backing are formed separately of different materials.

20 Claims, 4 Drawing Sheets

MULTI-PIECE OVERFENDER ASSEMBLIES AND METHODS OF MOUNTING THE SAME TO VEHICLES

TECHNICAL FIELD

The present specification generally relates to multi-piece overfender assemblies and methods for mounting overfender assemblies to vehicle fenders to at least partially cover the vehicle fenders.

BACKGROUND

Vehicles may include wheel wells that extend around the wheels of the vehicles. The wheel wells may comprise open cavities in the fenders of the vehicle. The fenders and other external portions of the body of the vehicle may be made from metal, such as steel or aluminum. Fenders may be particularly prone to dings and scrapes from loose rocks or dirt that are thrown up from a surface by the tires of the vehicle or surrounding vehicles.

It may be possible to line a metal fender with another component that is made from a plastic or different material than the fender itself, for example, an overfender. The overfender may generally take the shape of the fender so that the outline or aerodynamics of the vehicle are maintained. The overfender may line an external portion of the fender panel assembly so that the metal of the fender covered. Additionally, the overfender may be relatively less expensive to replace than a large, continuous sheet or sheets of metal. This may lower maintenance costs over the life of a vehicle.

Accordingly, a need exists for a multi-piece overfender assembly having an overfender backing and an overfender garnish where the overfender garnish is formed of a material that is different from the overfender backing.

SUMMARY

In one embodiment, a vehicle includes a wheel within a wheel well, a fender panel assembly that includes a fender outer panel and a fender inner panel, the fender panel assembly at least partially surrounding the wheel well, and an overfender assembly connected to the fender panel assembly. The overfender assembly includes an overfender backing including a fender outer panel connection portion that connects to the fender outer panel and a fender inner panel connection portion that connects to the fender inner panel and an overfender garnish connected to the overfender backing. The overfender garnish and the overfender backing are formed separately of different materials.

In another embodiment, an overfender assembly for a wheel well on a vehicle includes an overfender backing. The overfender backing includes a fender outer panel connection portion having an outside surface and a fender inner panel connection portion connected to the fender outer panel connection portion at an overfender backing corner. The overfender assembly also includes an overfender garnish that at least partially covers the outside surface of the fender outer panel connection portion.

In yet another embodiment, a method of providing an overfender assembly to a vehicle for covering an outside surface of a fender panel assembly of the vehicle includes forming an overfender backing that comprises a fender outer panel connection portion and a fender inner panel connection portion, forming an overfender garnish separately from the overfender backing, and connecting the overfender garnish to the overfender backing to form an overfender assembly.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
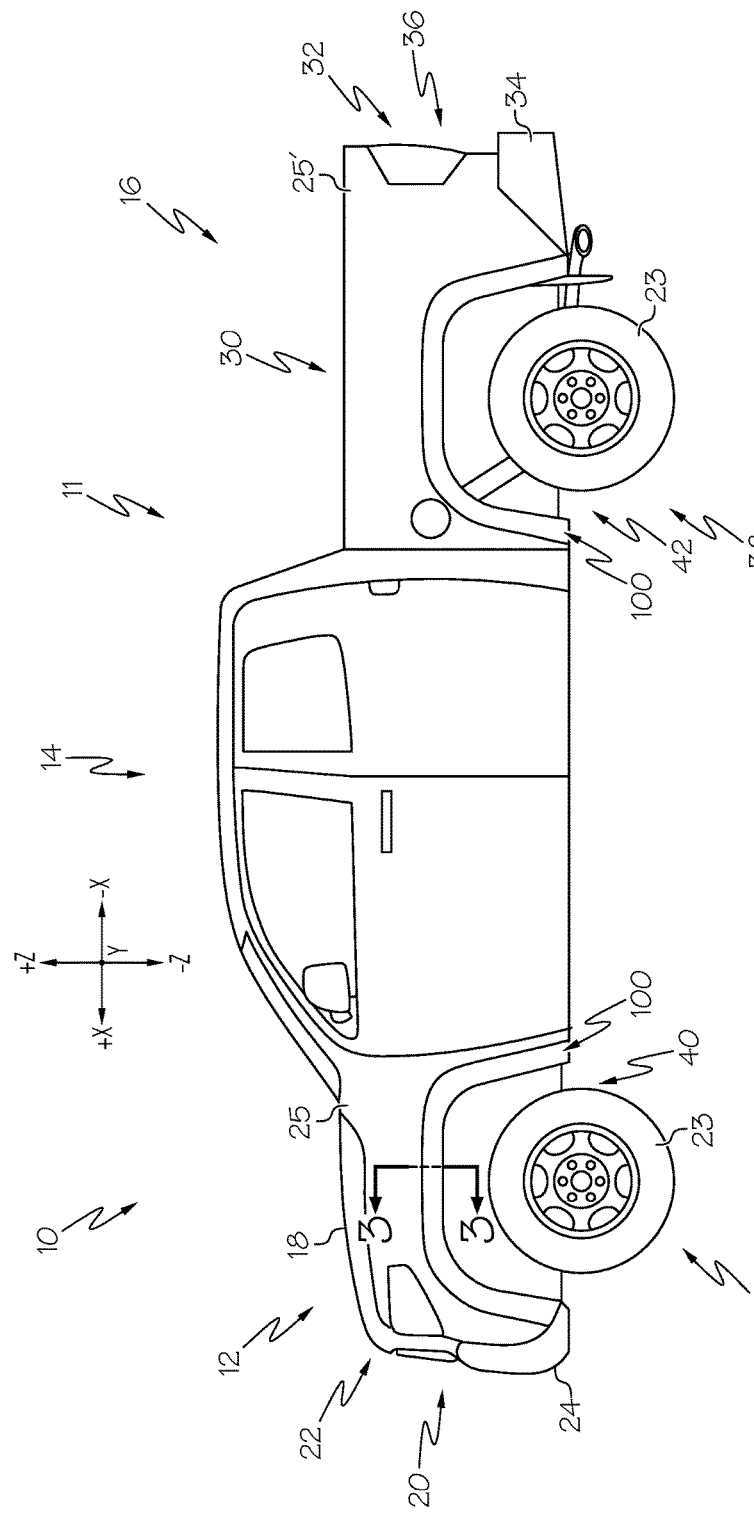
FIG. 1 depicts an example vehicle having fender panels and overfender assemblies surrounding wheel wells of the example vehicle, according to one or more embodiments shown and described herein.

FIG. 1 depicts an example embodiment of a vehicle 10 that includes a body 11 that may include a front section 12, a cabin 14, and a rear section 16. In the particular embodiment shown, the vehicle 10 is a truck, however, embodiments are not so limited. It is contemplated that the apparatuses and methods of using the apparatuses described herein could be applied to any type of vehicle; non-limiting examples of other types of vehicles may include a sedan, a sport-utility vehicle, or a van.

The front section 12 may extend forward of the cabin 14 in a vehicle longitudinal direction and the rear section 16 may extend rearward of the cabin 14 in the vehicle longitudinal direction. As used herein, the term "vehicle longitudinal direction" refers to the forward-rearward direction of the vehicle along a longitudinal axis down the centerline of the vehicle (i.e., in the +/− vehicle X-direction depicted in FIG. 1). Accordingly, the terms "forward" and "rearward" may refer to a position or relative position in the vehicle longitudinal direction. The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Accordingly, "above," "below," "upward," or "downward" may refer to position or relative position in the vehicle vertical direction. Further, the terms "inboard," "inward," "outboard" and "outward" are used to describe the relative positioning of various components of the vehicle with respect to a vehicle centerline, inboard or inward referring to a position that is closer to the center line from the same side of the centerline.

In some embodiments, the body 11 of the vehicle 10 may be generally symmetric about the longitudinal axis of the vehicle 10 such that features on the left side (which may also be referred to in some instances as the "driver side") of the body 11 of the vehicle 10 may be generally reproduced on the right side (which may also be referred to in some instances as the "passenger side") of the body 11 of the vehicle 10.

The front section 12 may include a hood 18, a grill assembly 20, a headlamp assembly 22, a front bumper 24, a front fender panel assembly 25, and one or more front wheels 26 that may include tires 23. The hood 18 (which may be formed of a metal material) is generally disposed above an engine compartment so as to be able to open the hood 18 to gain access to the engine compartment. The rear section 16 may include a bed 30, a rear lamp assembly 32, a rear bumper 34, a rear fender panel assembly 25', a tailgate 36, and one or more rear wheels 38 that may also include tires 23.

The front section 12 may include front wheel wells 40. The front wheel wells 40 may be recessed portions of the body 11 that provide a space for the front wheels 26. The front wheel wells 40 may extend from the front left and right sides of the vehicle 10 inward toward the vehicle centerline. The front fender panel assembly 25, or one or more portions thereof, may form the outside border of the front wheel well 40 and may comprise one or more external surfaces that may be covered by an overfender assembly 100 as described in greater detail herein.

The rear section 16 may include rear wheel wells 42. The rear wheel wells 42 may be recessed portions of the body 11 that provide a space for the one or more rear wheels 38. The rear wheel wells 42 may extend from the rear left and right sides of the vehicle 10 inward toward the vehicle centerline. The rear fender panel assembly 25', or one or more portions thereof, may form the outside border of the rear wheel well 42 and may comprise one or more external surfaces that may also be covered by an overfender assembly 100.

Figure 2:
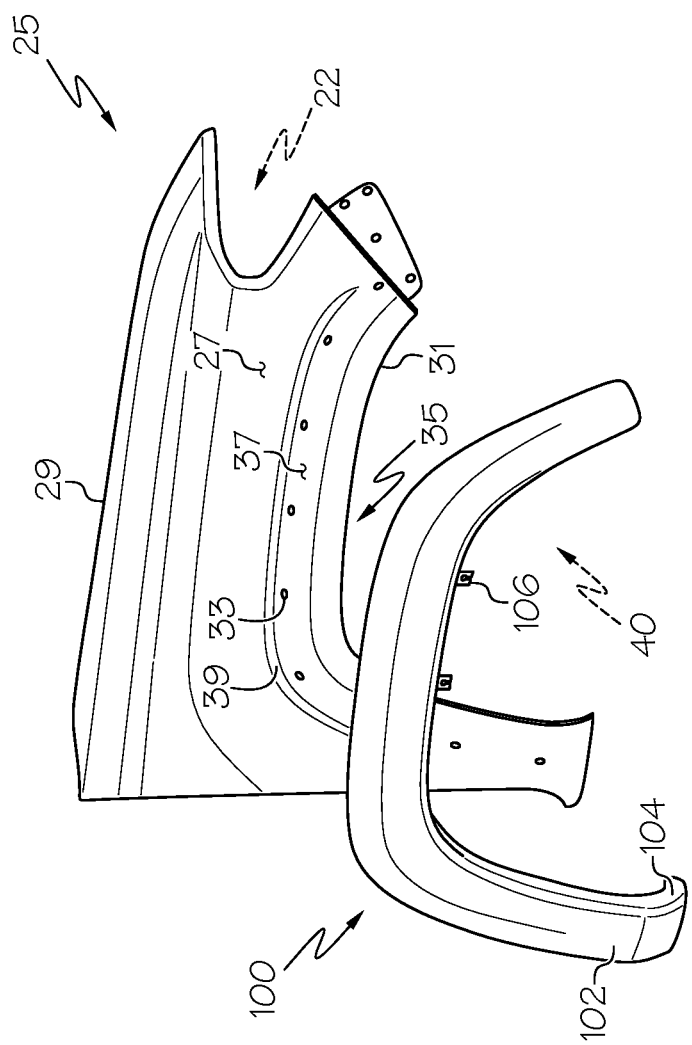
FIG. 2 depicts an exploded view of a front fender panel, a fender liner, and an overfender assembly of the vehicle of FIG. 1, according to one or more embodiments shown and described herein.

FIG. 2 shows the front fender panel assembly 25 for the right side of a vehicle, such as the example vehicle 10 shown in FIG. 1. The overfender assembly 100 is shown for the right front side of the vehicle 10 in exploded view from outside the right-front side of the vehicle 10. It is to be understood, as mentioned above, that the front fender panel assembly 25 on the right side of the vehicle 10 is substantially mirrored on the left side of the vehicle 10. Moreover, the structures described with respect to the front fender panel assembly 25 may have substantial equivalents in the rear fender panel assembly 25'.

The front fender panel assembly 25 may include a fender outer panel 27 that extends generally in the vehicle vertical direction between a hood edge 29 and a wheel well edge 31 of the fender outer panel 27. The hood edge 29 may extend generally in the vehicle longitudinal direction along the top of the fender outer panel 27. The wheel well edge 31 of the fender outer panel 27 may curve generally between the vehicle lateral and vehicle vertical directions around the outside of the front wheel well 40 of FIG. 1. The fender outer panel 27 may include an interface portion 35 for interfacing with the overfender assembly 100. The interface portion 35 may include a connection surface 37 that includes connection locations 33 and an outwardly angled portion 39 that may extend upward and outward from the connection surface 37. The outwardly angled portion 39 may contact the overfender assembly 100 along substantially the entire length of the overfender assembly 100 or a portion thereof providing a longitudinally extending seam.

The overfender assembly 100 may generally take the shape of the wheel well edge 31 of the front fender panel assembly 25. The overfender assembly 100 may include an overfender assembly first portion 102 for connecting with the fender outer panel 27 and an overfender assembly second portion 104 for connecting with a fender inner panel 28 (FIG. 3) of the front fender panel assembly 25.

The overfender assembly first portion 102 of the overfender assembly 100 may be placed over the connection surface 37 of the fender outer panel 27 to cover the connection surface 37. The overfender assembly second portion 104 may generally extend beneath the fender inner panel 28 that will be described in greater detail herein with reference to FIG. 3.

Still referring to FIG. 2, the overfender assembly 100 may couple to the front fender panel assembly 25 at the one or more connection locations 33 along the fender outer panel 27. In some embodiments, the one or more connection locations 33 comprise holes or passages through the fender outer panel 27 for installing one or more coupling devices such as a clip or a fastener. Additionally, the overfender assembly 100 may comprise one or more molded clips 106 that may fold beneath one or more portions of the front fender panel assembly 25 to couple the overfender assembly 100 to the front fender panel assembly 25.

Figure 3:
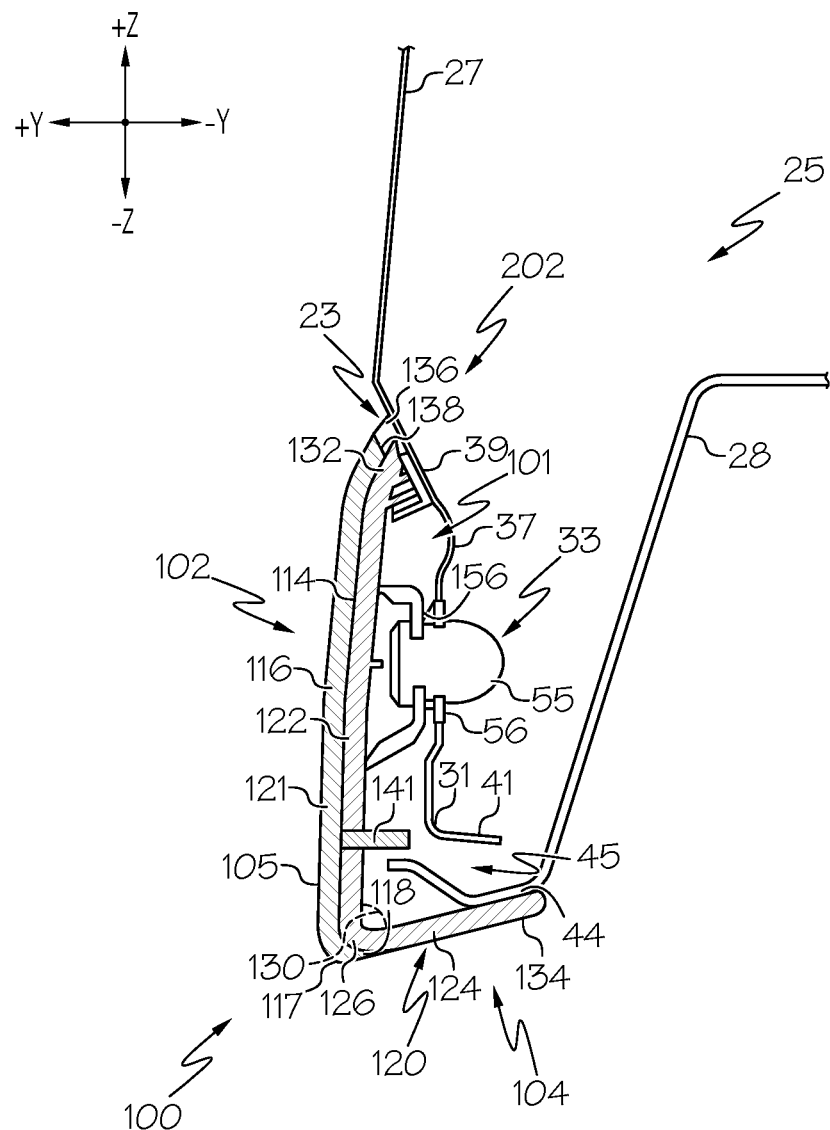
FIG. 3 depicts a cross-sectional view of a front fender panel including an overfender assembly of the vehicle of FIG. 1, according to one or more embodiments shown and described herein.

Referring now to FIG. 3, the overfender assembly 100 is shown in greater detail. The overfender assembly 100 is shown connected to the front fender panel assembly 25 along the cross-section line 3-3 of FIG. 1. The front fender panel assembly 25 shown in FIG. 3 includes the fender outer panel 27 and the fender inner panel 28. The fender outer panel 27 and the fender inner panel 28 may be connected at an inward side of the fender outer panel 27 and the fender inner panel 28 that is not shown in FIG. 3. The fender outer panel 27 may include the connection surface 37, the outwardly angled portion 39, the wheel well edge 31, and a fender outer panel terminal portion 41 extending inward from the wheel well edge 31.

The fender inner panel 28 may end in a fender inner panel terminal portion 44. The fender outer panel 27 and the fender inner panel 28 may be separated by a fender panel terminal portion gap 45 at the fender outer panel terminal portion 41 and the fender inner panel terminal portion 44. The overfender assembly 100 may connect between the fender outer panel 27 and the fender inner panel 28 to bridge the fender panel terminal portion gap 45 as described herein.

The overfender assembly 100 may comprise an overfender backing 120 and an overfender garnish 121. The overfender backing 120 may comprise a fender outer panel connection portion 122 that may connect to the fender outer panel 27 at the one or more connection locations 33. The fender outer panel connection portion 122 and the overfender garnish 121 may comprise the overfender assembly first portion 102 of the overfender assembly 100. The fender outer panel connection portion 122 may be a generally planar wall that extends the length of the overfender assembly 100 and generally curves around the front wheel well 40 as shown in FIG. 2. Still referring to FIG. 3, the fender inner panel connection portion 124 may be a generally planar wall that extends the length of the overfender assembly 100 and curves around the front wheel well 40 as shown in FIG. 2.

As shown in FIG. 3, the fender outer panel connection portion 122 and the fender inner panel connection portion 124 may meet at an overfender backing corner 126 that forms an overfender backing corner angle 130. The overfender backing corner angle 130 may be an acute angle, a right angle, or an obtuse angle. In the particular embodiment shown, the overfender backing corner 126 is sized as an acute angle. The overfender backing corner angle 130 may be in part determined by the dimension of the fender panel terminal portion gap 45. As the fender panel terminal portion gap 45 increases, one or more dimensions of the overfender assembly 100, for example the overfender backing corner angle 130 may increase such that the fender outer panel connection portion 122 and the fender inner panel connection portion 124 can connect to the fender outer panel 27 and the fender inner panel 28, respectively.

The fender inner panel connection portion 124 may extend from the fender outer panel connection portion 122 at the overfender backing corner 126 in the vehicle inward direction to extend beneath the fender inner panel terminal portion 44 extending from the fender inner panel 28. A fender inner panel contact end 134 of the fender inner panel connection portion 124 may contact the fender inner panel terminal portion 44 of the fender inner panel 28 along substantially the entire length of the fender inner panel connection portion 124. The fender outer panel connection portion 122 may extend from the fender inner panel connection portion 124 upward toward the outwardly angled portion 39. The fender outer panel connection portion 122 shown in FIG. 3 is depicted as connected to the fender outer panel 27 at one of the connection locations 33 shown in FIG. 2.

As shown in FIG. 3, a contact end 132 of the fender outer panel connection portion 122 may contact the outwardly angled portion 39 of the fender outer panel 27. The contact end 132 may contact the outwardly angled portion 39 of the fender outer panel 27 substantially the entire length of the fender outer panel connection portion 122 along a contact line 202.

The overfender garnish 121 may couple to the fender outer panel connection portion 122 at a garnish-backing interface 114 between the overfender garnish 121 and the fender outer panel connection portion 122. The garnish-backing interface 114 may end below the contact end 132 of the overfender backing 120. The overfender garnish 121 may comprise an outward-facing portion 116 and a wheel well-facing portion 118 such that it completely wraps around the overfender backing 120 and prevents the overfender backing 120 from being seen. The outward-facing portion 116 and the wheel well-facing portion 118 may meet at an overfender garnish corner 117. The outward-facing portion 116 may be coupled to an overfender gasket 136 at an outward-facing portion top end 138. The overfender gasket 136 may form an interface between the fender outer panel 27 and the outward-facing portion top end 138 that may inhibit the overfender garnish 121 from interfering with the connection between the overfender backing 120 and the fender outer panel 27 as will be described in greater detail herein.

Still referring to FIG. 3, the overfender garnish 121 may connect to the overfender backing 120 and at least partially cover the overfender backing 120 at the garnish-backing interface 114. The overfender garnish 121 may be connected to the overfender backing 120 by one or more connecting structures 141. The connecting structures 141 may be bolts, nails, screws, pegs or other structures that extend inward from the overfender garnish 121. In some embodiments, such as the example embodiment shown in FIG. 3, the connecting structure 141 may extend through a hole in the overfender backing 120. In some embodiments, the connecting structure 141 may be integral and monolithic with the overfender garnish 121 and the connecting structure 141 may be formed from the same material or materials as the overfender garnish 121. However, in some embodiments, the connecting structure 141 may be a separate structure that may be disconnectable from the overfender garnish 121, the overfender backing 120, or both.

In some embodiments, the overfender backing 120 may comprise a pliable material. For example, in some embodiments, the overfender backing 120 may comprise a plastic material, such as, polypropylene. Other non-limiting examples of the composition of the overfender backing 120, or portions thereof, may include polyethylene or polypropylethylene. Because the overfender backing 120 may be made from polypropylene or some other pliable material, it may be capable of bending. For example, the fender outer panel connection portion 122 and the fender inner panel connection portion 124 may bend outward from the overfender backing corner 126. This bending may create an internal stress in the overfender backing 120 at the overfender backing corner 126 that forces one or more portions of the overfender backing 120 against the fender outer panel 27, the fender inner panel 28, or both. As shown in FIG. 3, the fender inner panel contact end 134 is pushed against the fender inner panel terminal portion 44 of the fender inner panel 28 and the contact end 132 is against the outwardly angled portion 39 of the fender outer panel. The contact between these surfaces may generate an internal stress in the overfender backing corner 126.

When the overfender backing 120 is in an installed position on the front fender panel assembly 25, the overfender backing corner angle 130 may increase as the fender outer panel connection portion 122 and the fender inner panel connection portion 124 contact the outwardly angled portion 39 and the fender inner panel terminal portion 44, respectively, and the overfender backing 120 flexes at the overfender backing corner 126. This slight flexure of the overfender backing corner 126 may result in a torque in the fender outer panel connection portion 122 and the fender inner panel connection portion 124. The developed torque may cause the contact end 132 of the fender outer panel connection portion 122 to maintain contact with the outwardly angled portion 39 along the entire length of the overfender backing 120 surrounding the front wheel well 40 or a portion thereof. The internal stress caused by the flexure of the overfender backing 120 at the overfender backing corner 126 may also cause the fender inner panel connection portion 124 to maintain contact with the fender inner panel terminal portion 44 along the entire length of the overfender backing 120 surrounding the front wheel well 40 or a portion thereof.

The overfender garnish 121 may extend along the outside of the overfender backing 120 substantially the entire length of the overfender backing 120 around the front wheel well 40. However, the overfender garnish 121 may not extend along the entire height of the fender outer panel connection portion 122. Because a slight flexure may develop at the overfender backing corner 126 when the backing portion is installed on the front fender panel assembly 25, the fender outer panel connection portion 122 may flex slightly outward and the contact end 132 may maintain contact with the outwardly angled portion 39 along the length of the overfender backing 120. If the overfender garnish 121 extended the entire height of the fender outer panel connection portion 122, the overfender garnish 121 could contact the outwardly angled portion 39 of the fender outer panel 27 interfering with the contact between the contact end 132 and the outwardly angled portion 39 which could cause the overfender backing corner angle 130 to over-expand.

Embodiments of the overfender assembly 100 are contemplated in which the overfender garnish 121 surrounds the overfender backing 120 at the overfender backing corner 126. In such embodiments, the overfender garnish 121 may be formed from a stiffer material than the overfender backing 120. As used herein, the term "stiffness" or "stiff" refers to a material's elastic modulus (also known as "Young's modulus"). The elastic modulus defines the relationship between stress and strain in the described material. A material having a higher stiffness will have a higher elastic modulus.

An overfender garnish clearance 123 may be disposed between the overfender garnish 121 and the fender outer panel 27. The overfender garnish clearance 123 removes the overfender garnish 121 from contacting the outwardly angled portion 39 and interfering with the flexure of the overfender backing 120. Moreover, the overfender gasket 136 may be disposed in the overfender garnish clearance 123 and comprise a relatively soft material. The overfender gasket 136 may provide a buffer between the overfender garnish 121 and the outwardly angled portion 39. Additionally, the overfender gasket 136 may prevent the overfender backing 120 from being visible from outside the overfender assembly 100 when viewed from one of the sides of the vehicle 10. The overfender gasket 136 may be glued or otherwise affixed to the overfender garnish along the outward-facing portion top end 138.

In some embodiments of the overfender assembly 100, the overfender garnish 121 is formed of a stiffer material than the overfender backing 120. For example, in some embodiments the overfender garnish 121 may be formed from acrylonitrile butadiene styrene ("ABS") plastic and the overfender backing 120 may be formed from polypropylene. Additionally, the overfender garnish 121 may include an outside surface 105 that is coated. For example, some embodiments of the overfender garnish 121 the outside surface 105 may be coated with a metal. In some embodiments of the overfender garnish 121, the outside surface 105 may be coated with chrome. The chrome coating may be decorative, provide corrosion resistance, ease cleaning procedures, or increase surface hardness. In some embodiments, the chrome coating at least partially covers the outside surface 105 of the overfender garnish 121. In such embodiments, the overfender garnish 121 may exhibit metallic properties such as higher stiffness, as compared to the overfender backing 120, especially embodiments of the overfender backing 120 made from polypropylene or a similar material.

In some embodiments, the overfender garnish 121 may not fully surround the overfender backing corner 126. In some embodiments, the overfender garnish 121 may wrap around the outer diameter of the overfender backing corner 126 but the extent of the wheel well-facing portion 118 along the fender inner panel connection portion 124 may be limited. By limiting the length of the wheel well-facing portion 118 along the fender inner panel connection portion 124, the fender inner panel connection portion 124 may retain the ability to flex at the overfender backing corner 126.

Figure 4:
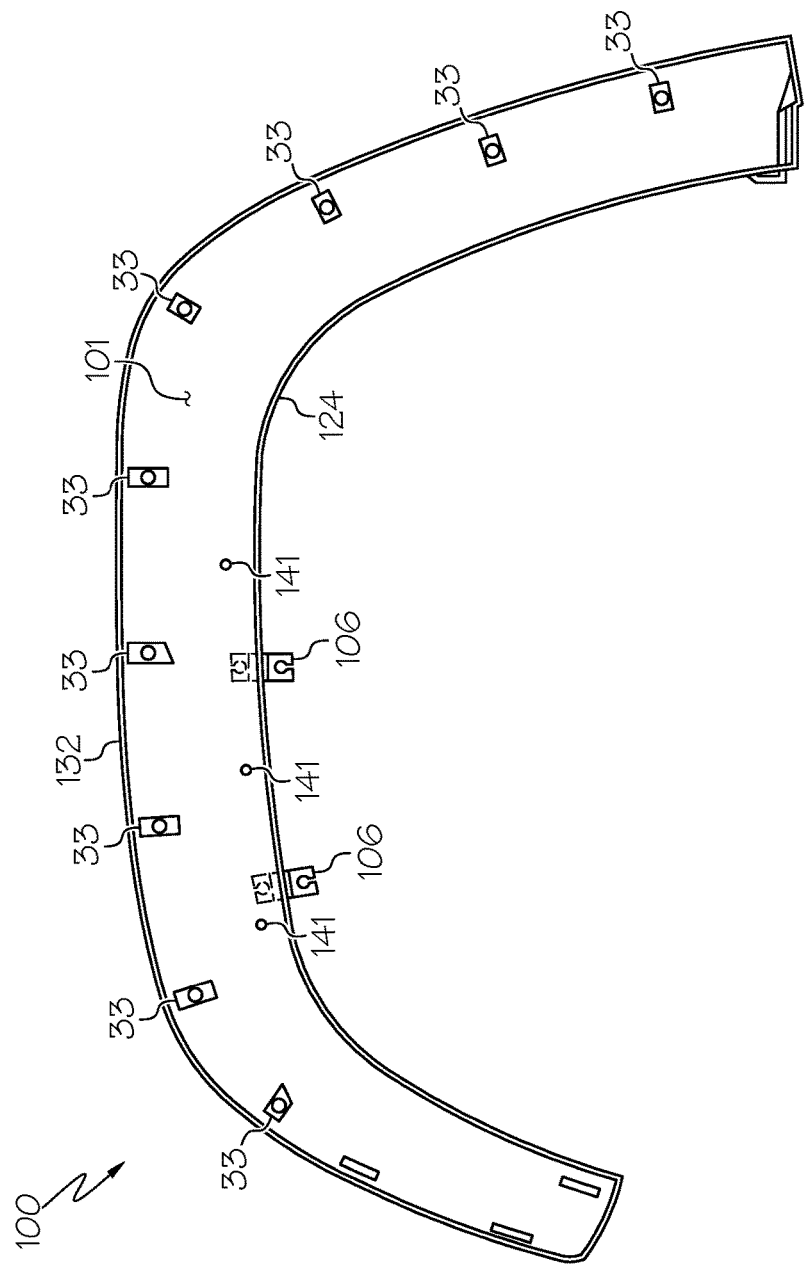
FIG. 4 depicts a schematic view of an internal side of the overfender assembly of FIG. 1, according to one or more embodiments shown and described herein.

FIG. 4 shows an internal side 101 including multiple connection locations 33 of the overfender assembly 100 for the right-front side of the vehicle 10. As shown in FIG. 3, the internal side 101 is the side of the overfender assembly 100 that faces the front fender panel assembly 25 of the vehicle 10. The connection locations may comprise platforms that extend in the vehicle inward direction from the internal side 101 of the overfender assembly 100. Referring back to FIG. 4, a number of the connection locations 33 may extend along the length of the overfender assembly 100 to keep the contact end 132 of the fender outer panel connection portion 122 against the fender outer panel 27 shown in FIG. 2. The connection locations 33 may generally follow the shape of the overfender assembly 100 as it bends around the front wheel well 40 of the vehicle 10. The overfender assembly shown in FIG. 4 includes 9 connection locations 33, however, it is contemplated that embodiments may have a different number of connection locations 33 so long as the overfender assembly 100 is sufficiently held against the front fender panel assembly 25 of the vehicle 10.

As shown in FIG. 3, the overfender assembly 100 may be held to the front fender panel assembly 25 with a pin 55 that passes through the overfender assembly 100 and the front fender panel assembly 25 at each connection location 33. The pin 55 may be made from molded plastic, rubber, or some other material and be compressible to fit within a bracket 156 on the internal side 101 of the overfender assembly 100 and a hole 56 in the fender outer panel 27. Once placed inside the bracket 156 and the hole 56, the pin 55 may expand to hold the overfender assembly 100 to the front fender panel assembly 25 with a friction fit. In some embodiments the bracket 156 may include a head, barbs, expandable arms, threading, or some other mechanism for keeping the pin 55 inside the bracket 156 and the hole 56.

In some embodiments, the pin 55 may adjustably fit within the bracket 156 and the hole 56. The pin 55 may be adjustable to adjust the space between the bracket 156 and the hole 56, thereby adjusting the distance between the overfender assembly 100 and the front fender panel assembly 25 at the connection location 33.

By adjusting the distance between the overfender assembly 100 and the front fender panel assembly 25, the angle of the overfender backing corner angle 130 may increase or decrease. Additionally, the distance between the overfender assembly 100 and the front fender panel assembly 25 may be adjusted at the connection location 33 to pull the contact end 132 into contact with the outwardly angled portion 39 of the fender outer panel 27 to ensure the contact end 132 contacts the fender outer panel 27. This may also compress the overfender gasket 136.

Also shown in FIG. 4 are the connecting structures 141 extending through the internal side 101 of the overfender assembly 100. FIG. 4 shows three connecting structures 141 passing through the internal side 101, but embodiments of the overfender assembly having a different number of connecting structures 141 are contemplated.

It should now be understood that a vehicle may include a two-piece overfender assembly for covering a fender panel assembly at a wheel well of the vehicle. The overfender assembly may include an overfender garnish that extends along an overfender assembly first portion. The overfender garnish may be coupled to and supported by a fender outer panel connection portion and include a chrome coating. The overfender assembly may prevent damage to the fender panel assembly as well as provide corrosion resistance, and ease cleaning procedures of the fender panel assembly.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a wheel within a wheel well;
a fender panel assembly that comprises a fender outer panel and a fender inner panel, the fender panel assembly at least partially surrounding the wheel well;
an overfender assembly connected to the fender panel assembly, the overfender assembly comprising:
an overfender backing comprising a fender outer panel connection portion that connects to the fender outer panel and a fender inner panel connection portion that connects to the fender inner panel; and
an overfender garnish connected to the overfender backing, the overfender garnish and the overfender backing formed separately of different materials.

2. The vehicle of claim 1, wherein the overfender assembly is coupled to the fender outer panel of the fender panel assembly and extends around the wheel well.

3. The vehicle of claim 1, wherein the overfender garnish comprises a stiffer material than the overfender backing.

4. The vehicle of claim 1, wherein the overfender garnish comprises acrylonitrile butadiene styrene.

5. The vehicle of claim 1, wherein the overfender garnish comprises an outside surface having a chrome coating.

6. The vehicle of claim 1, wherein:
the fender inner panel connection portion and the fender outer panel connection portion form an overfender backing corner that defines an overfender backing corner angle between the fender inner panel connection portion and the fender outer panel connection portion on an internal side of the overfender assembly, and
the fender inner panel connection portion is flexed outwardly with respect to the overfender backing corner angle by contact with the fender outer panel and the fender inner panel such that an internal stress is generated at the overfender backing corner.

7. The vehicle of claim 6, wherein the overfender backing corner angle is an acute angle.

8. The vehicle of claim 6, wherein an overfender garnish clearance is provided at a top of the overfender garnish between the overfender garnish and the fender outer panel.

9. The vehicle of claim 8, wherein an overfender gasket is provided in the overfender garnish clearance between the overfender garnish and the fender outer panel.

10. The vehicle of claim 1, wherein:
the fender inner panel ends at a fender inner panel terminal portion and the fender outer panel ends at a fender outer panel terminal portion and the fender inner panel terminal portion and the fender outer panel terminal portion are separated by a fender panel terminal portion gap; and
the overfender assembly extends between the fender outer panel and the fender inner panel to cover the fender panel terminal portion gap.

11. An overfender assembly for a wheel well on a vehicle, the overfender assembly comprising:
an overfender backing comprising:
a fender outer panel connection portion having an outside surface; and
a fender inner panel connection portion connected to the fender outer panel connection portion at an overfender backing corner; and
an overfender garnish that at least partially covers the outside surface of the fender outer panel connection portion.

12. The overfender assembly of claim 11, wherein the overfender garnish comprises a stiffer material than the overfender backing.

13. The overfender assembly of claim 12, wherein the overfender garnish comprises acrylonitrile butadiene styrene.

14. The overfender assembly of claim 13, wherein the vehicle-outer surface of the overfender garnish comprises a chrome coating.

15. The overfender assembly of claim 11, wherein the overfender backing comprises polypropylene and the overfender garnish comprises acrylonitrile butadiene styrene.

16. The overfender assembly of claim 11, wherein the overfender garnish and the overfender backing meet at a garnish-backing interface and the garnish backing interface ends below a contact end of the overfender backing forming an overfender garnish clearance between the overfender garnish and a fender outer panel around the wheel well of the vehicle.

17. The overfender assembly of claim 16, wherein the overfender garnish clearance includes an overfender gasket between the overfender garnish and the fender outer panel.

18. A method of providing an overfender assembly to a vehicle for covering an outside surface of a fender panel assembly of the vehicle comprising:
forming an overfender backing that comprises a fender outer panel connection portion and a fender inner panel connection portion;
forming an overfender garnish separately from the overfender backing; and
connecting the overfender garnish to the overfender backing to form an overfender assembly.

19. The method of claim 18, further comprising:
connecting the overfender assembly to a fender outer panel of the vehicle at connection locations along the fender outer panel connection portion that connects to the fender inner panel connection portion at an overfender backing corner.

20. The method of claim 19, further comprising:
flexing the fender outer panel connection portion and the fender inner panel connection portion at the overfender backing corner to form an internal stress in the overfender backing at the overfender backing corner by pressing the fender outer panel connection portion against the fender outer panel and the fender inner panel connection portion against a fender inner panel.

* * * * *

UNITED STATES PATENT AND TRADEMARK OFFICE
CERTIFICATE OF CORRECTION

| | | |
|---|---|---|
| PATENT NO. | : 10,399,606 B2 | Page 1 of 1 |
| APPLICATION NO. | : 15/883994 | |
| DATED | : September 3, 2019 | |
| INVENTOR(S) | : Scott L. Frederick and Scott P. Robison | |

It is certified that error appears in the above-identified patent and that said Letters Patent is hereby corrected as shown below:

On the Title Page

Column 2, Item (56), References Cited, Foreign Patent Documents, Line 14 delete "JP474558B2" and insert --JP4174558B2--, therefor.

Signed and Sealed this
Twenty-ninth Day of October, 2019

Andrei Iancu
*Director of the United States Patent and Trademark Office*